3,324,085
DYEABLE POLYESTERS MODIFIED BY DIFUNC-
TIONAL ORGANO-NITROGEN COMPOUNDS
Christian F. Horn, Charleston, W. Va., assignor to Union
Carbide Corporation, a corporation of New York
No Drawing. Filed Dec. 26, 1962, Ser. No. 247,383
14 Claims. (Cl. 260—75)

This invention is concerned in part with novel condensation polymers, particularly polyesters containing, in polymerized form, minor amounts of certain difunctional ester-forming organo-nitrogen compounds, and evidencing an improved affinity for dyestuffs. In addition, the invention is concerned with textile articles, i.e., fibers, filaments, yarns, etc., as well as with films and other structures, produced from the aforementioned polymers, and which also evidence an improved affinity for dyestuffs.

More particularly, the difunctional organo-nitrogen compounds contemplated by this invention are the substituted triazoles represented by the formulae:

(I)         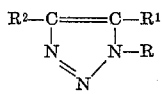

wherein —R is selected from the group consisting of the —R³—R⁴ and

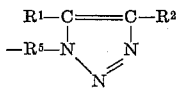

radicals, such that $R^1$ and $R^2$ are independently selected from the group consisting of hydrogen and the hydroxyalkyl radicals containing from 1 to about 8 carbon atoms and preferably from 1 to 4 carbon atoms, at least one of which (i.e., —$R^1$ and/or —$R^2$) is a hydroxyalkyl radical; —$R^3$— is an alkylene radical containing from 1 to about 8 carbon atoms and preferably from 1 to 4 carbon atoms; —$R^4$ is selected from the group consisting of hydrogen, the phenyl radical, the carboxy radical, the carbalkoxy radicals containing from 1 to about 8 carbon atoms and preferably from 1 to 4 carbon atoms in the alkyl moiety thereof, and a hydroxy radical separated from the nearest nitrogen atom by a carbon chain of the radical —$R^3$— of at least 2 carbon atoms; and —$R^5$— is an alkylene radical containing from 2 to 8 carbon atoms and preferably from 2 to 4 carbon atoms; both —$R^1$ and —$R^2$ being hydroxyalkyl radicals solely when —$R^4$ is selected from the group consisting of hydrogen and the phenyl radical.

The difunctional substituted triazoles contemplated by this invention can, by way of further definition, be represented by the formulae:

(II)        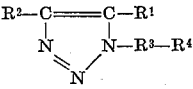

and (III)       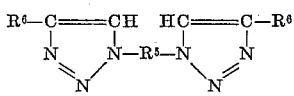

wherein —$R^1$, —$R^2$, —$R^3$—, —$R^4$ and —$R^5$— are as defined above and $R^6$ is a hydroxyalkyl radical as defined by —$R^1$ and —$R^2$, containing from 1 to 8 carbon atoms and preferably from 1 to 4 carbon atoms.

As illustrative of such difunctional substituted triazole, there can be mentioned:

1-(2-hydroxyethyl)-4-(1-hydroxy-1-methylethyl)-1,2,3-triazole,
1-(2-hydroxyethyl)-4-(2-hydroxyethyl)-1,2,3-triazole,
1-(2-hydroxyethyl)-4-hydroxymethyl-1,2,3-triazole,
1-(8-hydroxyoctyl)-4-(4-hydroxybutyl)-1,2,3-triazole,
1-(4-hydroxybutyl)-4-(8-hydroxyoctyl)-1,2,3-triazole,
1-benzyl-4,5-di(1-hydroxy-1-methylethyl)-1,2,3-triazole,
1-(2-hydroxyethyl)-4-(1-hydroxy-2-methylpropyl)-1,2,3-triazole,
4-(1-hydroxyethyl)-1-(2-hydroxypropyl)-1,2,3-triazole,
1,2-bis[4-hydroxymethyl-1,2,3-triazol-1-yl]ethane,
1,4-bis[4-hydroxymethyl-1,2,3-triazol-1-yl]butane,
1,5-bis[4-(1-hydroxy-1-methylethyl)-1,2,3-triazol-1-yl] pentane,
1,8-bis[4-hydroxymethyl-1,2,3-triazol-1-yl]octane,
1-carboethoxymethyl-4-hydroxymethyl-1,2,3-triazole,
1-(4-carbomethoxybutyl)-4-(2-hydroxyethyl)-1,2,3-triazole,
1-carbobutoxymethyl-4-hydroxymethyl-1,2,3-triazole,
1-carboxymethyl-4-(1-hydroxy-1-methylethyl)-1,2,3-triazole,
1-(8-carbomethoxyoctyl)-4-hydroxymethyl-1,2,3-triazole,
1-(8-carboxyoctyl)-4-hydroxymethyl-1,2,3-triazole,
1-butyl-4,5-di(4-hydroxybutyl)-1,2,3-triazole, and the like.

The difunctional substituted triazoles contemplated by this invention can be initially obtained in any convenient manner. A particularly suitable process in this regard, utilizing known starting materials, involves the reaction of an acetylenic compound of the formula $R^1$—C≡C—$R^2$ with an azide, viz, a monoazide of the formula $N_3$—$R^3$—$R^4$ to produce a monotriazole as defined above by Formula II, or with a diazide of the formula $N_3$—$R^5$—$N_3$ to produce a bis-triazole as defined above by Formula III.

Suitable acetylenic compounds which can be employed to produce the difunctional substituted triazoles contemplated by this invention include, for instance, propargyl alcohol, but-3-yn-2-ol, 2-methylbut-3-yn-2-ol, but-2-yn-1,4-diol, pent-4-yn-1-ol, hex-5-yn-1-ol, 4-methylpent-1-yn-3-ol, 5-methylhex-1-yn-3-ol, oct-7-yn-1-ol, 2,5-dimethylhex-3-yn-2,5-diol, and the like.

Illustrative of the monoazides which can be reacted therewith are methyl azide, ethyl azide, butyl azide, octyl azide, phenyl azide, phenylethyl azide, 2-hydroxyethyl azide, 4-hydroxybutyl azide, 8-hydroxyoctyl azide, 2-hydroxypropyl azide, carboxymethyl azide, 2-carboxyethyl azide, 4-carboxybutyl azide, 8-carboxyoctyl azide, 2-carboxypropyl azide, carbomethoxymethyl azide, 2-(carboethoxy)ethyl azide, 2-(carbobutoxy)ethyl azide, 4-(carboethoxy)butyl azide, 8-(carboethoxy)octyl azide, and the like.

Similarly, suitable diazides include 1,2-bis-triazoethane, 1,4-bis-triazobutane, 1,8-bis-triazooctane, and the like.

The reaction producing the difunctional substituted triazoles can be carried out by bringing the acetylenic compound into admixture with the azide in an inert organic solvent. The resulting mixture is then heated, preferably under reflux, at a temperature of from about 30° C. up to the reflux temperature of the solvent, and preferably at a temperature of from about 60° C. to about 100° C., depending for the most part upon the particular solvent present. Suitable solvents for use in this connection include toluene, benzene, heptane, acetone, ethanol, butanol, and the like.

The proportion in which the reactants are employed can vary broadly, with optimum results, measurable in terms of highest yields, being obtained when the reactants are employed in an approximately stoichiometric proportion. The amount of solvent present need only be sufficient to dissolve the reactants and provide a homogeneous reaction mixture, although an excess of solvent is generally employed.

The reaction period can also vary broadly, and need only be sufficient to produce the difunctional substituted triazole. Thus, the reaction period can vary from as little as about one hour up to several days or more, if desired. The difunctional substituted triazole thereby formed can subsequently be recovered in any convenient manner. For instance, the solvent and any unreacted material present may be removed by distillation or evaporation and the product thereafter recovered by crystallization or distillation. Alternatively, if the product is neither crystalline nor stable at its boiling point, the product may be recovered and used as herein described simply upon removal of the solvent and any unreacted material present, i.e. as a residue product.

It is to be noted that, when an asymmetrical acetylenic compound is employed as a reactant, the difunctional substituted triazole may constitute an isomeric mixture of compounds in which the substituents —$R^1$ and —$R^2$, as defined above in connection with Formulas I and II, are interchanged, with the isomer of greatest bulk in the 4-position generally predominating. Such isomeric mixture can be resolved, if desired, or utilized as such as herein described. For convenience, however, only one such isomer is mentioned in connection with each of the difunctional substituted triazoles specifically disclosed herein.

Unexpectedly, it has been found that the aforementioned difunctional substituted triazoles are eminently suited for use as modifiers in the production of high-melting, crystalline, linear polyesters, especially polyesters formed by the polycondensation reaction of terephthalic acid, or ester-forming derivative thereof, with an aliphatic glycol, or ester-forming derivative thereof, and in connection with such use are hereinafter referred to for convenience as the modifiers of this invention. The modified polyesters prepared in part from the modifiers of this invention, i.e., by the incorporation of such compounds in otherwise conventional polycondensation reaction mixtures, can, in turn, be employed to produce fibers which are readily dyeable with disperse dyestuffs by standard dyeing procedures. The dyed fibers thus obtained possess shades having good wash fastness and heat and light fastness, as well as stability to conventional dry cleaning procedures. The modified polyesters prepared in part from the modifiers of this invention can also be used to produce films and molded articles evidencing improved dyeability.

Synthetic linear polyesters are well known to the art and are readily prepared, for example, by the reaction of dibasic carboxylic acids, or their ester-forming derivatives, with dihydric alcohols, or their functional derivatives. The high-molecular weight linear polyesters thus obtained find frequent use in the production of textile articles, films, and the like. Of particular interest in this regard are the polyesters of terephthalic acid and its esters with acyclic and alicyclic aliphatic glycols, such as polyethylene terephthalate, and the polyester from dimethyl terephthalate and 1,4-cyclohexane-dimethanol, etc. Unfortunately, the filamentous products produced from these polyesters have little affinity for dyestuffs by conventional dyeing procedures, and consequently, their utility in the fabric field is somewhat restricted.

It was to be expected that many efforts would be made to improcve the dyeability of a film-, and filament-forming material having as many desirable characteristics as those possessed by polyethylene terephthalate. Such efforts have indeed been made. However, the efforts that have resulted in some degree of success in making polyethylene terephthalate more dyeable have done so only at the expense of degrading the polymer substantially with respect to its other characteristics. Thus, for example, a reported effort to improve the dyeability of polyethylene terephthalate by incorporating within its structure minor amounts of certain amino alcohols, thereby giving the polymer a greater ability to absorb acetate dyes and acid dyes, seriously reduces the heat stability of the polyethylene terephthalate so modified. Another effort in this direction involved chemical incorporation of long chain polyalkylene oxides having molecular weights of the order of 1000 to 6000. This modification of the polyethylene terephthalate unfortunately made it quite sensitive to air oxidation and to light. Another proposal involved the utilization of toxic carriers such as the chlorobenzenes, chlorophenols, and the like, for the dyeing process. Still another involved the application of vat or acetate dyes under superatmospheric pressure at temperatures above 100° C. Another required the use of fiber-swelling agents or dye carriers. Still another involved the use of pigments that are mixed directly with the polyethylene terephthalate melt before spinning.

It is apparent that these efforts have at best had very limited success. The methods involving chemical incorporation of modifying agents such as amino alcohols and polyalkylene oxides have involved substantial reduction in thermal stability, the use of toxic carriers is inherently undesirable and dangerous, and special dyeing techniques, such as those requiring dyestuffs that are stable at high temperatures, are too expensive to be commercially practicable.

These difficulties have now been overcome without impairing the characteristics of the polyester. Thus, for example, modified polyethylene terephthalate fibers and films made in accordance with this invention are readily dyeable by ordinary dyeing techniques, while at the same time retaining excellent heat and light stability, dimensional stability and other desirable properties.

The dyeable linear polyesters of this invention are prepared essentially from an aromatic dicarboxylic acid or ester forming derivative thereof, with a diol, such as an acyclic or alicyclic aliphatic glycol, an aliphatic-aromatic diol, an aromatic diol, or a diester thereof, and a small amount of at least one modifier of this invention.

Particularly suitable diols for use in preparing the dyeable linear polyesters of this invention are the acyclic and alicyclic aliphatic glycols containing from 2 to 10 carbon atoms, especially those represented by the general formula $HO(CH_2)_mOH$, wherein $m$ is an integer of from 2 to 10, such as ethylene glycol, trimethylene glycol, pentamethylene glycol, hexamethylene glycol, decamethylene glycol, and the like. Other suitable aliphatic glycols include, 1,4-cyclohexanedimethanol, and the like. It is known that any glycol of an aliphatic nature, whether or not it contains aromatic nuclei, can be used in the production of linear polyesters. Thus, the term aliphatic glycol as employed herein includes all those glycols of acyclic and alicyclic aliphatic nature which are known to the art to be suitable. Still other suitable diols include aliphatic-aromatic diols such as 4-hydroxybenzyl alcohol and p-xylene glycol, aromatic diols such as hydroquinone, etc. Mixtures of two or more of these diols can also be employed, with up to about 10 mole percent or slightly more of any one diol being replaced by a different diol.

Particularly suitable aromatic dicarboxylic compounds for use in preparing the dyeable linear polyesters of this invention are the monocyclic aromatic dicarboxylic acids and the dialkyl esters thereof preferably containing from 1 to about 8 carbon atoms in each alkyl ester radical, especially terephthalic acid and the dialkyl esters thereof, such as dimethyl terephthalate and similar esters in which the alkyl ester radicals more preferably contain from 1 to about 4 carbon atoms. Other suitable aromatic dicarboxylic acids or esters include:

Isophthalic acid, p,p′-diphenylcarboxylic acid, p,p′-dicarboxydiphenyl ethane, p,p′-dicarboxydiphenyl hexane, p,p′-dicarboxydiphenyl sulfide, p,p′-dicarboxydiphenyl sulfone, p,p′-dicarboxydiphenyl ether, p,p′-dicarboxyphenoxy ethane, 2,6-naphthalene dicarboxylic acid; their alkyl esters; and the like. Mixtures of two or more of these dicarboxylic acids or esters can also be used, with up to about 10 mole percent or slightly more of any one aromatic dicarboxylic acid or ester being replaced by a different aromatic dicarboxylic acid or ester, or by an aliphatic dicarboxylic acid or ester, such as adipic acid, succinic acid, sebacic acid, dimethyl sebacate, dimethyl 1,20-eicosane dioate, and the like.

Dyeable linear polyesters can also be prepared by the self-condensation of a hydroxycarboxylic acid or ester together with a modifier of this invention, or by the partial replacement of a diol or aromatic dicarboxylic acid or ester with a hydroxycarboxylic acid or ester within the limits hereinabove described.

In preparing the dyeable linear polyesters of this invention, at least about a 1.3 to 1 molar ratio of diol to dicarboxylic acid or ester is used. However, an excess of diol to the dicarboxylic compound ranging from about 2 to 10 moles of diol per mole of the dicarboxylic compound can also be used. A more satisfactory ratio is from about 1.3 to about 7 moles of diol per mole of the dicarboxylic compound, with a ratio of from about 1.5 to about 5 moles of diol per mole of the dicarboxylic compound being especially preferred.

The amount in which the modifiers of this invention are employed in preparing the dyeable linear polyesters can be varied from about 0.1 to about 10 mole percent of the modifier based upon the total amount of dicarboxylic compounds charged, i.e. as the free acid or as the ester. A preferred ratio is from about 0.15 to about 4 mole percent of the modifier based upon the total amount of dicarboxylic compound charged.

A monofunctional molecular weight regulator such as those described in British Patent 838,663 can also be employed in an amount varying generally from about 0.1 to about 3.5 mole percent of the molecular weight regulator based upon the total amount of dicarboxylic compounds charged. A preferred ratio is from about 0.15 to about 2.5 mole percent of the molecular weight regulator based upon the total amount of dicarboxylic compounds charged.

In preparing the dyeable linear polyesters of this invention, the prescribed amounts of diol, dicarboxylic compound, modifier of this invention, and catalyst when desired, are charged to a reactor. When a dicarboxylic acid ester is employed as a reactant, the reaction mixture is heated at a temperature of from about 150° C. to about 270° C., and preferably from 170° C. to about 260° C., in an inert atmosphere to effect an initial ester interchange reaction. Alternatively, an initial direct esterification can be carried out by employing the free dicarboxylic acid instead of the ester as a reactant. Thereafter, any excess glycol is removed by heating the reaction mixture to a temperature of up to about 300° C., under reduced pressure in an inert atmosphere, or by passing a stream of an inert gas through the reaction mixture at atmospheric pressures. A polycondensation is then carried out by heating the reaction mixture at a temperature of from about 225° C. to about 325° C., and preferably from about 250° C. to about 290° C., under a reduced pressure of from about 0.1 mm. to about 5 mm. of mercury, in an inert atmosphere. If desired, the entire reaction can be carried out at atmospheric pressure while bubbling a stream of inert gas through the reaction mixture, the rate of gas flow being increased as the polycondensation proceeds. The total reaction period can be from about one to twelve hours, according to the catalyst employed and its concentration, the temperature, the pressure, the starting monomers, the viscosity desired for the polyester product, etc., as is known to the art.

The monomers are preferably reacted in contact with a suitable catalyst in order to shorten the reaction period and thus lessen the possibility of discoloration. Any of the well known polyesterification catalysts can be used, such as antimony oxide, zinc acetate, manganese acetate, cobaltous acetate, zinc succinate, zinc borate, magnesium methoxide, sodium methoxide, barium oxide, cadmium formate, litharge, dibutyltin oxide, tetraisopropyl titanate, calcium titanium silicate, and the like. Other conventional catalysts can also be employed. The concentration of the catalyst can be varied from about 0.001 to about 1 percent by weight, based upon the total amount of dicarboxylic compounds charged. A preferred amount is from about 0.005 to about 0.5 percent by weight of catalyst, and more preferably from about 0.01 to about 0.2 percent by weight of catalyst, based upon the total amount of dicarboxylic compounds charged. Other materials can also be included in the reaction mixture, as for example, color inhibitors such as alkyl or aryl phosphites; pigments, delusterants or other additives, such as titanium dioxide or barium carbonate; or viscosity stabilizers, etc.

A typical procedure for producing the polyesters is described, for example, in U.S. 2,465,319, although this procedure can be varied by one skilled in the art in light of this disclosure.

It was indeed unexpected that the modifiers of this invention would be sufficiently stable, both chemically and thermally, to withstand the polycondensation conditions in the presence of the other reactants, as well as the high temperatures necessary for spinning the polyesters. It was also surprising that the fibers produced from these polyesters showed little difference in physical properties from the unmodified polyester fibers, and that they exhibited considerably enhanced dyeability, as well as many other desirable textile properties. By way of illustration, such fibers, upon dyeing with many disperse dyestuffs by standard procedures, possess medium to deep shades of color having good wash fastness and light fastness, as well as stability to conventional dry-cleaning operations. Fabrics produced from the fibers are also characterized by a desirable "hand" and "wash-and-wear" properties.

The specific examples which follow serve as further illustration of the present invention. In the examples, the reduced viscosity, ($I_R$), of the dyeable linear polyesters of this invention is determined by dividing the specific viscosity of a solution of the polyester by the concentration of the polyester in the solution. The specific viscosity is determined by dividing the difference between the viscosity of the polyester solution and the viscosity of the solvent by the viscosity of the solvent. In particular, the reduced viscosity of the polyesters is calculated from the equation:

(IV) $$I_R = \frac{\Delta N}{N_o} \times \frac{1}{C}$$

wherein $\Delta N$ is the difference between the flow time of the polyester solution and the flow time of solvent, $N_o$ is the flow time of the solvent, and C is the concentration of the polyester in grams per 100 milliliters of solution. The reduced viscosities are obtained at a polyester concentration of 0.2 gram per 100 milliliters of solution, using a 3:2 mixture of phenol and tetrachloroethane as the solvent. The reduced viscosity of the polyesters can vary from about 0.2 to about 3, with values from about 0.35 to about 1 being preferred.

The dyeable linear polyesters of this invention can be melt-spun to form filaments and yarns. In a typical operation, before melt-spinning, the polyesters are dried overnight at a temperature of 90° C. under a reduced pressure of 2 mm. of mercury, and then melt-extruded in a plunger-type spinning machine at a temperature of from 270° C. to 295° C., using a spinnerette having 30 holes, each 0.015 inch in diameter. The orifice velocity is 3 feet per minute and the yarn is taken up at 150 feet per minute, a draw ratio of 50:1. The yarn is hot-stretched at a temperature of 90° C. around an electrically heated pin to an extent of from 200 to 500 percent, and then continuously annealed at a temperature of 150° C. over an electrically heated bar, allowing 10 percent relaxation. The yarn is thereafter woven into fabrics and dyed. The spinning procedure is conventional for polyesters, and is well known to the art.

The fabrics are dyed by standard procedures both in the absence of, and using dye-carriers. The dye baths have liquor-to-fiber bath ratio of 40:1 and, based upon the weight of the fabric to be dyed, contain 1 percent by weight of sodium N-methyl-N-oleoyltaurate. The dye concentration is 3 percent by weight based upon the weight of the fabric.

In a typical dyeing procedure, the various components of the dyebath are admixed and made up to volume with distilled water. The dyestuff is introduced as a paste in 0.25 percent by weight of acetic acid, based upon the weight of the fabric to be dyed. The fabric is scoured in a commercially available drier. About 5 to 10 grams of the fabric is added to the dyebath, and the temperature of the bath is raised to the boil over a period of 15 minutes, and held at the boil for an additional period of 90 minutes. The dyed fabric is then rinsed in warm water and scoured in an aqueous solution containing 1 percent by weight of a commercially available alkyl phenyl polyethylene glycol ether surfactant and 0.25 percent by weight of soda ash, based upon the weight of the fabric, at a temperature of 60° C. for a period of 15 minutes. The dyed and scoured fabric is finally rinsed in water and air dried.

Among the disperse dyestuffs which readily dye the fibers produced from the polyesters of this invention, one can mention Celliton Fast Pink BA (Disperse Red 15, Color Index No. 60710), Celliton Fast Red GGA Ex. Conc. (Disperse Red 17, Color Index No. 11210), and the like.

*Example I*

A mixture of 160 parts by weight of dimethyl terephthalate, 4.2307 parts by weight of 1-(2-hydroxyethyl)-4-(1-hydroxy-1-methylethyl)-1,2,3-triazole, 150 parts by weight of ethylene glycol, 0.0164 part by weight of antimony oxide, 0.0657 part by weight of zinc acetate, and 0.0593 part by weight of manganese acetate is charged to a reactor and heated at a temperature of 180° C. for a period of 4 hours to bring about an ester exchange, while distilling off methanol formed during the reaction. The temperature of the reaction mixture is then raised to 235° C. to remove the glycol excess. Thereafter, the temperature of the reaction mixture is maintained at 260° C. for a period of 6 hours to carry out a polycondensation. During the reaction, a vigorous stream of nitrogen is passed through the melt at atmospheric pressure. A crystalline polymer is thereby obtained having a reduced viscosity of 0.51 and a melting point of 256–258° C., and characterized by excellent dyeable fiber-forming and cold-drawing properties. Fibers melt-spun from this polyester, having the following physical properties:

| | |
|---|---|
| Tenacity _____g.p.d__ | 3 |
| Elongation _____percent__ | 18 |
| Stiffness _____g.p.d__ | 98 |
| Shrinkage— | |
| At 100° C. _____percent__ | 2.5 |
| At 150° C. _____do____ | 4.0 |
| At 200° C. _____do____ | 9.0 |
| Sticking temperature _____° C__ | 246 | are dyed to medium to deep, light- and wash-fast shades with Celliton Fast Red GGA Ex. Conc. without the use of a carrier. In a similar manner, dyeable fibers are also obtained from modified polyethylene terephthalate and terephthalic acid-1,4-cyclohexane dimethanol polyesters independently employing 1-(2-hydroxyethyl)-4-hydroxymethyl - 1,2,3 - triazole and 4-(1-hydroxyethyl)-1-(2-hydroxypropyl)-1,2,3-triazole as the modifier of this invention. By way of comparison, fibers melt spun from conventional, unmodified polyethylene terephthalate and terephthalic acid-1,4-cyclohexanedimethanol polyesters are dyed to only a very light shade with Celliton Fast Red GGA Ex. Conc.

*Example II*

A mixture of 160 parts by weight of dimethyl terephthalate, 4.5735 parts by weight of 1-benzyl-4,5-di-(1-hydroxy-1-methylethyl)-1,2,3-triazole, 150 parts by weight of ethylene glycol, 0.0165 part by weight of zinc acetate, and 0.0329 part by weight of manganese acetate is charged to a reactor and heated at a temperature of 180° C. for a period of several hours to bring about an ester exchange, while distilling off the methanol formed during the reaction. The temperature is then slowly raised to remove the glycol excess. Thereafter, the reaction mixture is heated at a temperature maintained in the range of 260° to 270° C. for a period of about 6 hours to carry out a polycondensation. During the reaction, a vigorous stream of nitrogen is passed through the melt at atmospheric pressure. A crystalline polymer is thereby obtained having a reduced viscosity of 0.44 and a melting point of 255–256° C. Fibers melt-spun from this polyester are characterized by enhanced disperse dyeability upon dyeing with Celliton Fast Red GGA Ex. Conc., as compared with fibers melt-spun from conventional, unmodified polyethylene terephthalate polyesters. In similar manner, dyeable fibers are also obtained from modified polyethylene terephthalate and terephthalic acid-1,4-cyclohexanedimethanol polyesters employing 1-butyl-4,5-di(4-hydroxybutyl)-1,2,3-triazole as the modifier of this invention.

*Example III*

A mixture of 160 parts by weight of dimethyl terephthalate, 8.3130 parts by weight of 1,4-bis[4-hydroxymethyl-1,2,3-triazol-1-yl]butane, 150 parts by weight of ethylene glycol, 0.0168 part by weight of antimony oxide, 0.0673 part by weight of zinc acetate, and 0.0505 part by weight of manganese acetate is charged to a reactor and heated at a temperature of 180° C. for a period of 5 hours to bring about an ester exchange, while distilling off the methanol formed during the reaction. The temperature is then slowly raised to remove the glycol excess. Thereafter, the reaction temperature is heated at a temperature of 280° C. for a period of about 6 hours to carry out a polycondensation. During the reaction, a vigorous stream of nitrogen is passed through the melt at atmospheric pressure. A crystalline polymer is thereby obtained having a melting point of 253–255° C. Fibers melt spun from this polyester are characterized by enhanced disperse dyeability upon dyeing with Celliton Fast Red GGA Ex. Conc., as compared with fibers melt spun from conventional, unmodified polyethylene terephthalate polyesters.

*Example IV*

A mixture of 160 parts by weight of dimethyl terephthalate, 2.1030 parts by weight of 1-carboxymethyl-4-hydroxymethyl-1,2,3-triazole, 150 parts by weight of ethylene glycol, 0.0162 part by weight of antimony oxide, 0.0648 part by weight of zinc acetate is charged to a reactor and heated at a temperature of 180° C. for several hours to bring about an ester exchange, while distilling off the methanol formed during the reaction. The temperature is then slowly raised to remove the glycol excess. Thereafter, the reaction mixture is heated at a temperature maintained in the range of 260° C. to 270° C. for a period of about 6 hours to carry out a polycondensation. During the reaction, a vigorous stream of nitrogen is passed through the melt at atmospheric pressure. A crystalline polymer is thereby obtained having a melting point of 256–258° C. Fibers melt spun from this polyester are characterized by enhanced disperse dyeability upon dyeing with Celliton Fast Red GGA Ex. Conc., as compared with fibers melt spun from conventional, unmodified polyethylene terephthalate polyesters.

In similar manner, dyeable fibers are also obtained from modified polyethylene terephthalate and terephthalic acid- 1,4-cyclohexanedimethanol polyesters employing 1-(4-carbomethoxybutyl)-4-(2-hydroxyethyl)-1,2,3-triazole as the modifier of this invention.

The following example illustrates the production of the modifiers of this invention.

*Example V*

A mixture of 14 grams of propargyl alcohol and 32 grams of carboethoxymethyl azide, dissolved in 100 milliliters of ethanol is heated at reflux for a period of about 4 days. The reaction mixture is then concentrated on a rotary evaporator at room temperature under a reduced pressure of 1–2 mm. of Hg to remove the solvent present. In this manner, an essentially quantitative conversion to 1-carboethoxymethyl-4-hydroxymethyl-1,2,3-triazole is obtained. In similar manner, 1-(2-hydroxyethyl)-4-(1-hydroxy-1-methylethyl)-1,2,3-triazole is obtained by the reaction of 2-methylbut-3-yn-2-ol with 2-hydroxyethyl azide; 1-(2-hydroxyethyl)-4-hydroxymethyl-1,2,3-triazole is obtained by the reaction of propargyl alcohol with 2-hydroxyethyl azide; 1-benzyl-4,5-di(1-hydroxy-1-methylethyl)-1,2,3-triazole is obtained by the reaction of 2,5-dimethylhex-3-yn-2,5-diol with benzyl azide; 1-butyl-4,5-di(4-hydroxybutyl)-1,2,3-triazole is obtained by the reaction of hex-5-yn-1-ol with butyl azide; etc.

What is claimed is:

1. The dyeable linear polymeric polyester condensation product of reactants consisting essentially of (a) a dicarboxylic compound selected from the group consisting of the monocyclic aromatic dicarboxylic acids and the dialkyl esters thereof; (b) an aliphatic glycol containing from 2 to 10 carbon atoms; and, based upon the total amount of dicarboxylic compounds (c) from about 0.1 to about 10 mole percent of a difunctional compound of the formula:

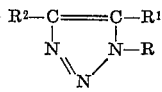

wherein —R is selected from the group consisting of the —R³—R⁴ and

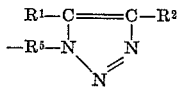

radicals, wherein —R¹ and —R² are independently selected from the group consisting of hydrogen and hydroxyalkyl of from 1 to 8 carbon atoms, at least one of which is hydroxyalkyl; —R³— is alkylene of from 1 to 8 carbon atoms; —R⁴ is selected from the group consisting of hydrogen, phenyl, carboxy, carbalkoxy of from 1 to 8 carbon atoms in the alkoxy moiety thereof, and hydroxy separated from the nitrogen atom on which the —R³—R⁴ group is attached by a carbon chain of the radical —R³— of at least 2 carbon atoms; and —R⁵— is alkylene of from 2 to 8 carbon atoms; —R¹ and —R² both being hydroxyalkyl solely when —R⁴ is selected from the group consisting of hydrogen and phenyl.

2. The dyeable linear polymeric polyester consisting essentially of the condensation product of (a) dimethyl terephthalate; (b) ethylene glycol; and, based upon the total amount of said dimethyl terephthalate, (c) from about 0.15 to about 4 mole percent of 1-(2-hydroxyethyl)-4-(1-hydroxy-1-methylethyl)-1,2,3-triazole.

3. The dyeable linear polymeric polyester consisting essentially of the condensation product of (a) dimethyl terephthalate; (b) ethylene glycol; and, based upon the total amount of said dimethyl terephthalate, (c) from about 0.15 to about 4 mole percent of 1-(2-hydroxyethyl)-4-hydroxymethyl-1,2,3-triazole.

4. The dyeable linear polymeric polyester consisting essentially of the condensation product of (a) dimethyl terephthalate; (b) ethylene glycol; and, based upon the total amount of said dimethyl terephthalate, (c) from about 0.15 to about 4 mole percent of 1-benzyl-4,5-bis(1-hydroxy-1-methylethyl)-1,2,3-triazole.

5. The dyeable linear polymeric polyester consisting essentially of the condensation product of (a) dimethyl terephthalate; (b) ethylene glycol; and, based upon the total amount of said dimethyl terephthalate, (c) from about 0.15 to about 4 mole percent of 1-(2-hydroxyethyl)1-(2-hydroxypropyl)-1,2,3-triazole.

6. The dyeable linear polymeric polyester consisting essentially of the condensation product of (a) dimethyl terephthalate; (b) ethylene glycol; and, based upon the total amount of said dimethyl terephthalate, (c) from about 0.15 to about 4 mole percent of 1,4-bis[4-hydroxymethyl-1,2,3-triazol-1-yl]butane.

7. The dyeable linear polymeric polyester consisting essentially of the condensation product of (a) dimethyl terephthalate; (b) ethylene glycol; and, based upon the total amount of said dimethyl terephthalate, (c) from about 0.15 to about 4 mole percent of 1-carboethoxymethyl-4-hydroxymethyl-1,2,3-triazole.

8. The stretched, dyeable textile article composed of a dyeable linear polymeric polyester condensation product of reactants consisting essentially of (a) a dicarboxylic compound selected from the group consisting of the monocyclic aromatic dicarboxylic acids and the dialkyl esters thereof; (b) an aliphatic glycol containing from 2 to 10 carbon atoms; and, based upon the total amount of dicarboxylic compounds, (c) from about 0.1 to about 10 mole percent of a difunctional compound of the formula:

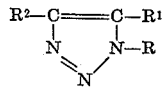

wherein —R is selected from the group consisting of the —R³—R⁴ and

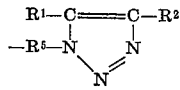

radicals, wherein —R¹ and —R² are independently selected from the group consisting of hydrogen and hydroxyalkyl of from 1 to 8 carbon atoms, at least one of which is hydroxyalkyl; —R³— is alkylene of from 1 to 8 carbon atoms; —R⁴ is selected from the group consisting of hydrogen, phenyl, carboxy, carbalkoxy of from 1 to 8 carbon atoms in the alkoxy moiety thereof, and hydroxy separated from the nitrogen atom on which the —R³—R⁴ group is attached by a carbon chain of the radical —R³— of at least 2 carbon atoms; and —R⁵— is alkylene of from 2 to 8 carbon atoms; —R¹ and —R² both being hydroxylalkyl solely when —R⁴ is selected from the group consisting of hydrogen and phenyl.

9. The stretched, dyeable textile article composed of a dyeable linear polymeric polyester consisting essentially of the condensation product of (a) dimethyl terephthalate; (b) ethylene glycol; and, based upon the total amount of said dimethyl terephthalate, (c) from about 0.15 to about 4 mole percent of 1-(2-hydroxyethyl)-4-(1-hydroxy-1-methylethyl)-1,2,3-triazole.

10. The stretched, dyeable textile article composed of a dyeable linear polymeric polyester consisting essentially of the condensation product of (a) dimethyl terephthalate; (b) ethylene glycol; and, based upon the total amount of said dimethyl terephthalate, (c) from about 0.15 to about 4 mole percent of 1-(2-hydroxyethyl)-4-hydroxymethyl-1,2,3-triazole.

11. The stretched, dyeable textile article composed of a dyeable linear polymeric polyester consisting essentially of the condensation product of (a) dimethyl terephthalate; (b) ethylene glycol; and, based upon the total amount of said dimethyl terephthalate, (c) from about 0.15 to about 4 mole percent of 1-benzyl-4,5-bis(1-hydroxy-1-methylethyl)-1,2,3-triazole.

12. The stretched, dyeable textile article composed of a dyeable linear polymeric polyester consisting essentially of the condensation product of (a) dimethyl terephthalate; (b) ethylene glycol; and, based upon the total amount of said dimethyl terephthalate, (c) from about 0.15 to about 4 mole percent of 4-(1-hydroxyethyl)-1-(2-hydroxypropyl)-1,2,3-triazole.

13. The stretched, dyeable textile article composed of a dyeable linear polymeric polyester consisting essentially of the condensation product of (a) dimethyl terephthalate; (b) ethylene glycol; and, based upon the total amount of said dimethyl terephthalate, (c) from about 0.15 to about 4 mole percent of 1,4-bis[4-hydroxymethyl-1,2,3-triazol-1-yl]butane.

14. The stretched, dyeable textile article composed of a dyeable linear polymeric polyester consisting essentially of the condensation product of (a) dimethyl terephthalate; (b) ethylene glycol; and, based upon the total amount of said dimethyl terephthalate, (c) from about 0.15 to about 4 mole percent of 1-carboethoxymethyl-4-hydroxymethyl-1,2,3-triazole.

References Cited
UNITED STATES PATENTS

| | | | |
|---|---|---|---|
| 3,159,646 | 12/1964 | Milionis et al. | 260—75 |
| 3,161,651 | 12/1964 | Stansbury et al. | 260—75 |

WILLIAM H. SHORT, *Primary Examiner.*

SAMUEL H. BLECH, L. P. QUAST,
*Assistant Examiners.*